(12) United States Patent
Kastl

(10) Patent No.: US 6,380,693 B1
(45) Date of Patent: Apr. 30, 2002

(54) APPARATUS FOR OPERATING AT LEAST ONE LIGHT-EMITTING DIODE

(75) Inventor: Roland Kastl, Unterhaching (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/635,210

(22) Filed: Aug. 9, 2000

(30) Foreign Application Priority Data

Aug. 11, 1999 (DE) .......................................... 199 37 923

(51) Int. Cl.[7] .............................................. H05B 37/02
(52) U.S. Cl. .............................. 315/209 R; 315/200 R; 315/291
(58) Field of Search ............................... 315/56, 200 R, 315/209 R, 208, 291, 294

(56) References Cited

U.S. PATENT DOCUMENTS

| | | | | |
|---|---|---|---|---|
| 4,467,246 A | * | 8/1984 | Tanaka et al. | 315/158 |
| 4,651,061 A | * | 3/1987 | Spissinger | 315/200 R |
| 4,902,936 A | * | 2/1990 | Yamaha | 315/209 R |
| 5,384,518 A | * | 1/1995 | Kido et al. | 315/225 |
| 5,604,406 A | * | 2/1997 | Gaus | 315/56 |

\* cited by examiner

*Primary Examiner*—Don Wong
*Assistant Examiner*—Jimmy T. Vu
(74) *Attorney, Agent, or Firm*—Carlo S. Bessone

(57) ABSTRACT

The invention relates to an apparatus for operating at least one light-emitting diode (LD) comprising an electronic transformer (10), the output of the electronic transformer (10) having a high-frequency rectifier (12) connected to it whose output is connected to at least one light-emitting diode (LD), the high-frequency rectifier (12) and the at least one light-emitting diode (LD) being combined to form a separate physical unit (14).

10 Claims, 3 Drawing Sheets

APPARATUS FOR OPERATING AT LEAST ONE LIGHT-EMITTING DIODE

BACKGROUND OF THE INVENTION

The present invention relates to an apparatus for operating at least one light-emitting diode.

By nature, light-emitting diodes need to be supplied with direct current. It is thus not possible for light-emitting diodes to be directly operated from voltage sources. In practice, therefore, light-emitting diodes are operated using matched DC supply circuits.

In some areas of use for light-emitting diodes, for example in the furniture sector, halogen lamps are also used for illumination purposes in addition to light-emitting diodes for special effects. Unlike light-emitting diodes, halogen lamps are operated from high-frequency voltage sources. The prior art therefore uses a separate drive circuit for the light-emitting diodes and a separate drive circuit for the halogen lamps.

SUMMARY OF THE INVENTION

The present invention sets itself the object of proposing an implementation which is more economical than that in the prior art and is particularly distinguished by a low level of installation complexity.

To achieve this object, the invention proposes that the output of the electronic transformer contained in the drive circuit for a halogen lamp have a high-frequency rectifier connected to it whose output is then coupled to the at least one light-emitting diode, the high-frequency rectifier and the at least one light-emitting diode being combined to form a separate physical unit.

This measure enables the transformer which needs to be provided in the drive circuit for the at least one light-emitting diode in the prior art to be dispensed with. In respect of the fact that the dimensional design of the transformer for driving the at least one light-emitting diode needs to be geared to mains frequency, the present case affords a considerable saving in terms of cost and space. The electronic transformer provided in the drive circuit for the halogen lamp usually comprises, first, a mains rectifier followed by a high-frequency inverter which is in turn connected to a transformer. Since the transformer is designed for high frequency, this component is much smaller than the transformer in the drive circuit for the at least one light-emitting diode in the prior art.

Since the output signal from the electronic transformer is not suitable for driving at least one light-emitting diode, rectification is performed. The combination of the high-frequency rectifier and the at least one light-emitting diode to form a separate physical unit, in accordance with the solution according to the invention, considerably simplifies the level of installation complexity, since the connection between the high-frequency rectifier and the light-emitting diode is already in place, and installation merely requires that this separate unit be connected to the output of the electronic transformer.

To this extent, the solution according to the invention also consists in providing an apparatus which comprises a high-frequency rectifier and at least one light-emitting diode, the high-frequency rectifier and the at least one light-emitting diode being combined to form a separate physical unit.

With particular advantage, the high-frequency rectifier is in this case arranged in the light-emitting housing of the at least one light-emitting diode, and provision may be made for the high-frequency rectifier and the at least one light-emitting diode to be arranged on a single circuit board. Accommodation in a common housing reduces the manufacturing complexity for such combinations, which has an associated reduction in cost.

The high-frequency rectifier may be in the form of a half-wave rectifier or a full-wave rectifier. With particular advantage, the high-frequency rectifier comprises a smoothing circuit.

In terms of the current limiting required for operating light-emitting diodes, two types of implementation may be provided: on the one hand, at least one series circuit comprising at least one series resistor and at least one light-emitting diode is arranged at the output of the high-frequency rectifier, and on the other hand at least one impedance, in particular at least one inductor, is provided at the output of the electronic transformer. In terms of the latter implementation, it is particularly advantageous for the impedance to be realized by the high-frequency rectifier. For this purpose, particularly advantageous high-frequency rectifiers can be found in patent application GR 99 P 5556 DE, inventor Felix Franck, entitled "Gleichrichter mit Mittelpunkteinspeisung" [Rectifier with midpoint feed].

Further advantageous developments of the invention are defined in the dependent claims.

BRIEF DESCRIPTION OF THE DRAWINGS

Illustrative embodiments of the invention are described in more detail below with reference to the appended drawings, in which.

DESCRIPTION OF THE PREFERRED EMBODIMENTS

Figure 1:
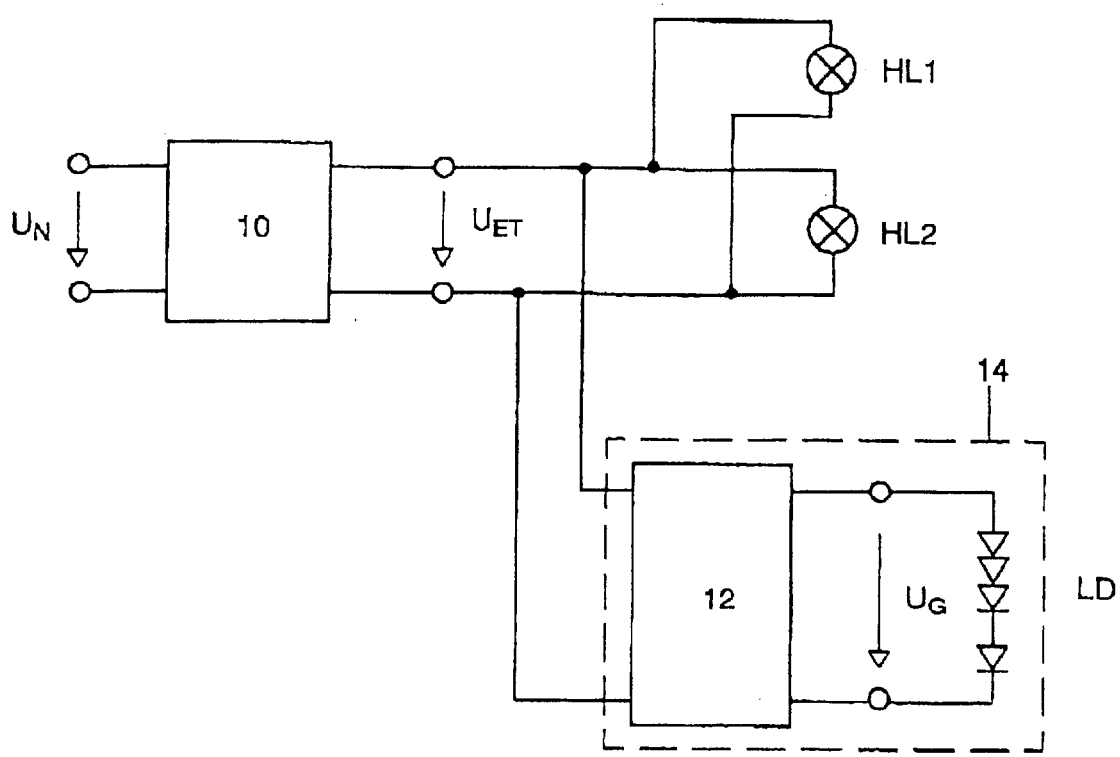
FIG. 1 shows a block diagram of a circuit arrangement implementing the solution according to the invention.

FIG. 1 shows a circuit arrangement in which a mains voltage, for example 230 V/50 Hz is applied to the input of an electronic transformer 10. The output of the electronic transformer 10 provides a voltage $U_{ET}$ which is used for operating two halogen lamps HL1, HL2. The voltage $U_{ET}$ is 12 $V_{RMS}$/35 kHz ... 200 kHz, for example. It is additionally supplied to a high-frequency rectifier 12 whose output provides a voltage $U_G$ for operating a plurality of light-emitting diodes LD. The dashed line indicates that the high-frequency rectifier 12 and the light-emitting diodes LD are arranged in a separate physical unit 14. In this case, provision may be made for the high-frequency rectifier 12 to be arranged in the light-emitting housing of the at least one light-emitting diode LD, with it being particularly advantageous for the high-frequency rectifier 12 and the at least one light-emitting diode LD to be arranged on a single circuit board, as mentioned.

Figure 2:
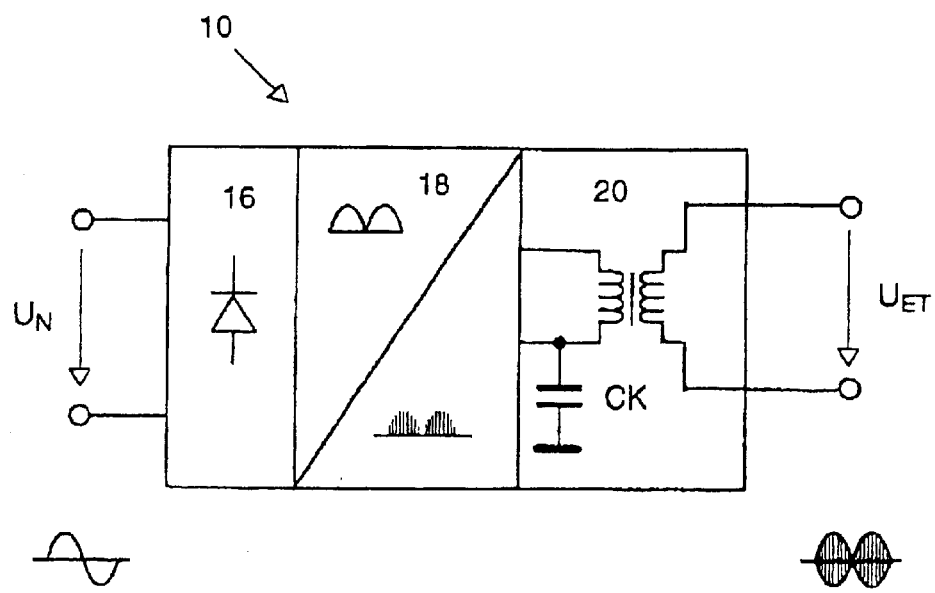
FIG. 2 shows a block diagram of a more detailed illustration of the design of the electronic transformer from FIG. 1.

FIG. 2 shows a more detailed illustration of the electronic transformer 10 from FIG. 1. The mains voltage $U_N$ is first rectified in a first stage 16. This is followed by a high-frequency rectifier 18 followed by a transformer 20 which is designed for high frequency and whose primary is connected to a coupling capacitor $C_K$. The waveform of the output voltage $U_{ET}$ can be seen in the bottom right of the illustration in FIG. 2.

Figure 3A:
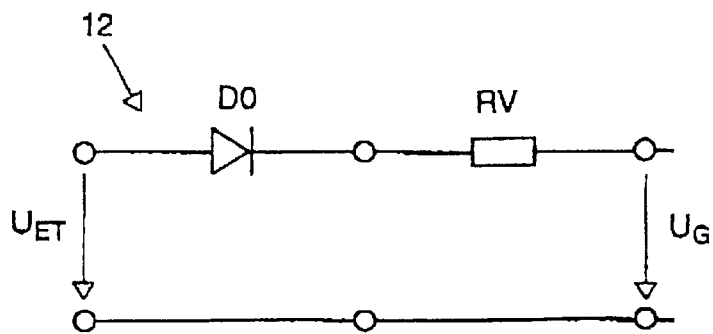
FIGS. 3a to 3e show various embodiments of high-frequency rectifiers for use in the apparatus according to the invention.
Figure 3B:
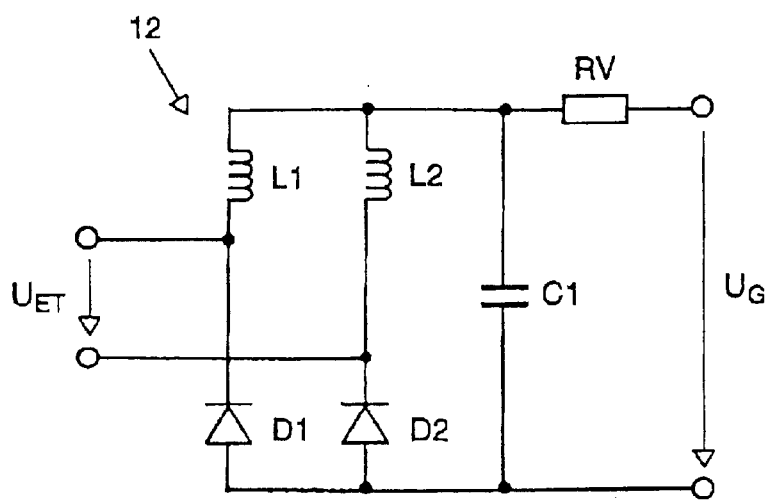
Figure 3C:
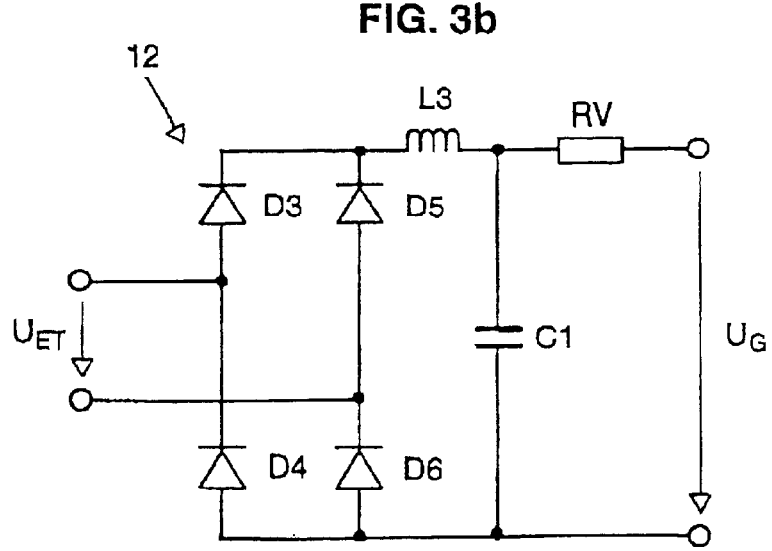

FIGS. 3a to 3e, in which identical reference symbols denote identical components, show examples of various embodiments of high-frequency rectifiers 12 which may be used in the apparatus according to the invention. FIG. 3a first shows a half-wave rectifier having a diode D0 and a nonreactive series resistor RV for current limiting purposes. FIGS. 3b to 3e show full-wave rectifiers, with the voltage $U_{ET}$ in FIG. 3b being applied between the midpoints of two series circuits, each comprising a coil L1, L2 and a diode D1, D2. A capacitor C1 is used for smoothing purposes. In FIG. 3c, the voltage $U_{ET}$ is applied between the midpoints of two series circuits, each comprising two diodes D3, D4, D5, D6. A coil L3 is connected between the diode network and the series resistor RV.

Figure 3D:
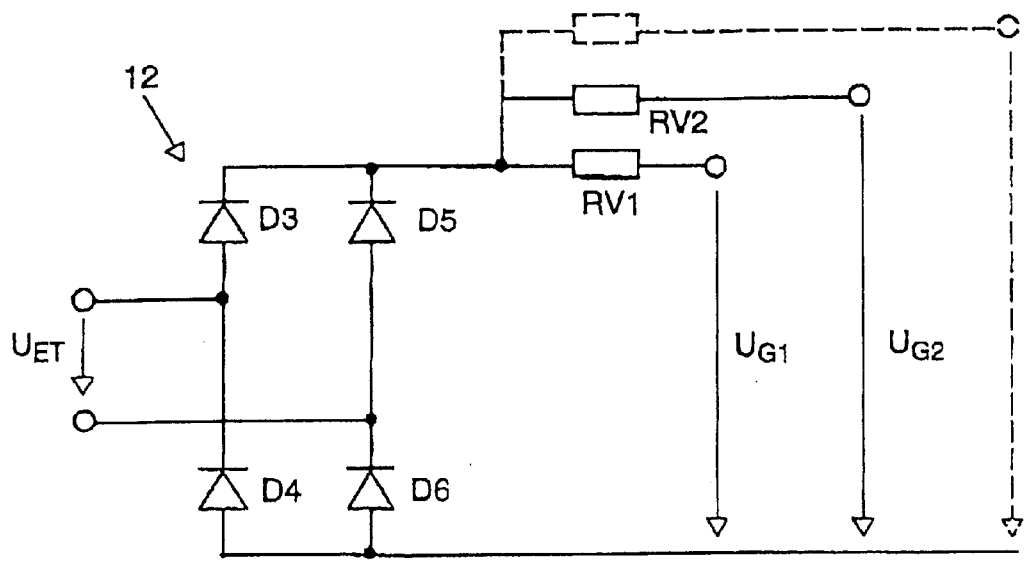

FIG. 3d shows a variant, which is modified as compared with FIG. 3c, without smoothing, having a plurality of parallel-connected series resistors RV1, RV2 for providing a plurality of (in particular, different) output voltages UG1, UG2.

Figure 3E:
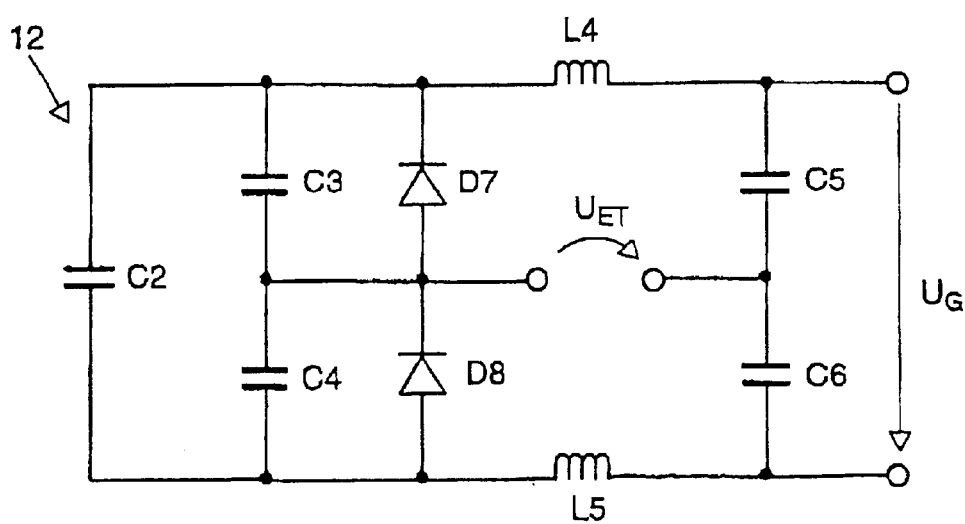

The variant shown in FIG. 3e is distinguished by the feature that, in contrast to the embodiments shown in FIGS. 3a to 3d, it requires no nonreactive series resistor RV. Instead, current limiting in this case is effected by the high-frequency rectifier itself, which acts as an impedance. The way in which such a rectifier works and further comparable embodiments, in particular advantages thereof, can be found in patent application GR 99 P 5556 DE, inventor Felix Franck, entitled "Gleichrichter mit Mittelpunkteinspeisung" [Rectifier with midpoint feed], the disclosure of which is incorporated in the present application by way of this reference.

What is claimed is:

1. An apparatus for operating a halogen lamp and a light emitting diode (LED), the apparatus comprising:
    a transformer that receives an input voltage and provides a high frequency output voltage;
    a halogen lamp connected to said transformer and that receives and is operated by the high frequency output voltage;
    a rectifier connected to said transformer and that receives the high frequency output voltage and provides a DC output; and
    an LED connected to said rectifier and that receives and is operated by the DC output, said rectifier and said LED being housed together and spaced from said transformer and said halogen lamp.

2. The apparatus as claimed in claim 1, wherein the rectifier is a half-wave or a full-wave high-frequency rectifier.

3. The apparatus as claimed in claim 1, wherein the rectifier comprises a smoothing circuit.

4. The apparatus as claimed in claim 1, wherein at least one nonreactive series resistor is arranged at the output of the rectifier for current limiting purposes.

5. The apparatus as claimed in claim 1, wherein at least one impedance is arranged at the output of the transformer for current limiting purposes.

6. The apparatus as claimed in claim 5, wherein the impedance is realized by the rectifier.

7. The apparatus of claim 1, wherein said rectifier and said LED are on a same circuit board and wherein said circuit board is spaced from said transformer and said halogen lamp.

8. The apparatus of claim 1, further comprising a light emitting housing in which said LED and said rectifier are housed, said halogen lamp and said transformer being outside and spaced from said housing.

9. The apparatus of claim 1, wherein the high frequency output voltage has a frequency of 35 kHz to 200 kHz.

10. An apparatus for simultaneously operating a halogen lamp and a light emitting diode (LED), the apparatus comprising:
    a transformer that receives a mains input voltage and provides an output voltage having a frequency of 35 kHz to 200 kHz;
    a halogen lamp connected to said transformer and that receives and is operated by the 35 kHz to 200 kHz output voltage;
    a high frequency rectifier connected to said transformer and that receives the 35 kHz to 200 kHz output voltage and provides a DC output;
    an LED connected to said rectifier and that receives and is operated by the DC output; a circuit board on which said high frequency rectifier and said LED are mounted; and
    a light emitting housing in which said LED and said rectifier are housed, said halogen lamp and said transformer being outside and spaced from said housing.

* * * * *